G. M. VON HASSEL.
PLANT LIFTING AND TRANSPLANTING MACHINE.
APPLICATION FILED OCT. 12, 1912.
1,129,924.
Patented Mar. 2, 1915.
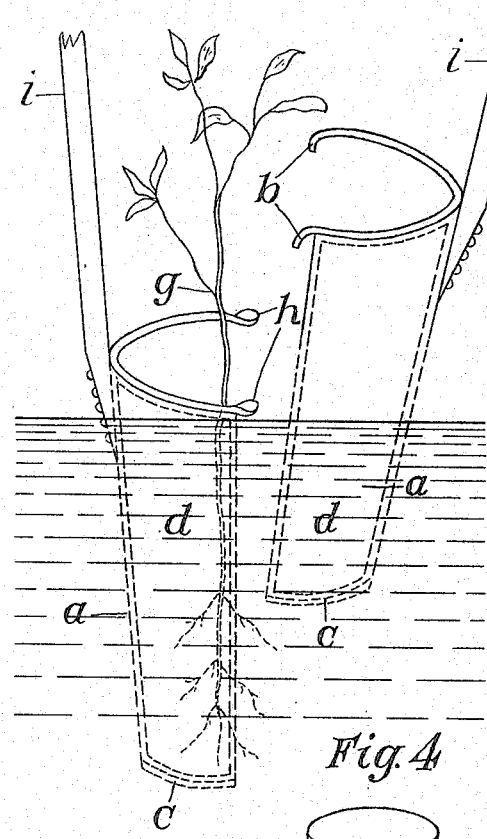
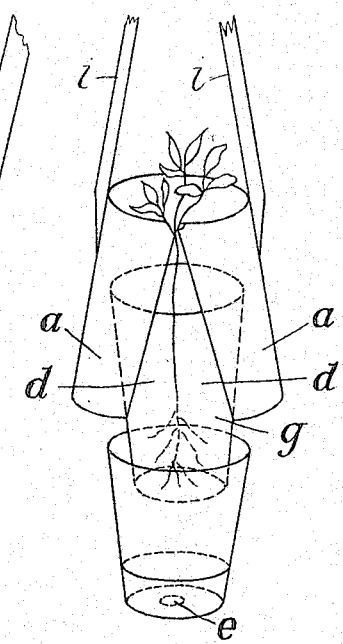
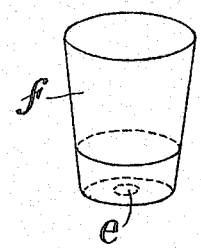
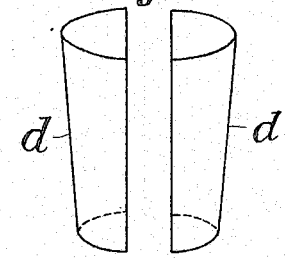

UNITED STATES PATENT OFFICE.

GEORG M. von HASSEL, OF NEW YORK, N. Y.

PLANT LIFTING AND TRANSPLANTING MACHINE.

1,129,924. Specification of Letters Patent. Patented Mar. 2, 1915.

Application filed October 12, 1912. Serial No. 725,545.

*To all whom it may concern:*

Be it known that I, GEORG M. VON HASSEL, civil engineer, a citizen of Germany, residing at New York, county and State of New York, have invented a new and Improved Plant Lifting and Transplanting Machine, of which the following is a specification.

This invention relates to a device for removing or lifting plants from the ground together with a certain amount of the surrounding soil into which the roots have grown, the roots being also removed with the plant.

My improved device is designed to not only remove the plants and roots from the ground, but to firmly hold that portion of the soil, removed by the operation, around the roots while the plant is being placed into a suitable receptacle. From the time the plant is removed until it is transplanted, it is firmly held by the transplanting device and hence none of the mother soil is lost nor are the roots injured.

I will now proceed to describe my invention in detail, the novel features of which I will point out in the appended claims, reference being had to the accompanying drawing, forming part hereof, wherein:—

Figure 1 is a perspective view of my improved transplanting device, it being illustrated in operative position; Fig. 2 is a similar view, on a reduced scale, illustrating the manner of placing the removed plant into a receptacle; Fig. 3 is a similar view of a preferred form of pot; and Fig. 4 is also a similar view of a preferred form of stand for the pot illustrated in Fig. 3.

As herein illustrated one of the elements of my improved transplanting device or plant lifter is embodied in the form of a holder adapted to retain a pot, consisting of the halves $a$—$a$, each half being preferably substantially semi-cylindrical, as shown, and sharpened at its lower end, as at $c$. For the purpose of connecting the halves $a$ together, after they have been forced into the soil around the plant, I provide one of the halves $a$ with hooks $b$—$b$ and the other half with eyes $h$—$h$ adapted to receive the said hooks. Each half $a$ is provided with a handle $i$ long enough to enable the device to be operated by the user.

To remove a plant, indicated by $g$ the halves $a$ are forced into the soil around the plant, either one at a time or both together, preferably at an angle, that is to say, the handles $i$ will be separated or moved apart enough to cause the sharpened ends $c$ of the halves to come together when the halves $a$ have been forced into the soil around the plant. After the halves $a$ have been forced into the soil, the handles $i$ will be brought together until the hooks $b$—$b$ aline with the eyes $h$—$h$, at which time the half, carrying the hooks, will be forced still farther into the soil, causing the hooks to enter the eyes, and lock the halves $a$—$a$ together.

While the device above described will remove a plant, I prefer to force into the soil, at the same time that the lifting device is forced into the soil, the pot which is to contain the transplanted plant. For the above reason, I employ the pot illustrated in Fig. 3, which consists of the semi-cylindrical halves $d$—$d$. Before the lifter is forced into the ground one of the halves $d$ of the pot is placed in one of the halves $a$ of the lifter and the other half $d$ of the pot into the other half $a$ of the lifter, after which the lifter is forced into the ground, as above described. After the lifter has been forced home into the soil and locked, the roots of the plant $g$ will be incased by the halves $d$—$d$ of the pot. To remove the plant, the lifter will be pulled upwardly bringing with it the pot and plant $g$ therein contained, after which the pot will be set into the stand $f$ (Fig. 4), and the handles $i$—$i$ separated, causing the halves $a$—$a$ of the lifter to leave the pot. The pot will now be kept together by the stand $f$ and retain the plant $g$. The bottom of the stand $f$ is provided with an opening $e$ for the passage of percolating water or drippings. The pot acts in combination with the lifter and is in fact a coöperating part of the lifter.

Having now described my invention, what I claim and desire to secure by Letters Patent is:

1. A plant lifting device, consisting of a pot, comprising a plurality of sections, and a holder for retaining said sections and forcing the same into the ground.

2. A plant lifting device, consisting of a pot comprising a plurality of sections, a holder for retaining said sections, said holder consisting of a plurality of sections sharpened at their lower end and adapted to be forced into the ground, and means for locking said holder sections and pot sections together after they have been forced into the ground.

3. A plant lifting device consisting of a pot comprising a plurality of semi-cylindrical sections, a holder for said sections, consisting of a plurality of semi-cylindrical sections sharpened at their lower ends and adapted to be forced into the ground, eyes carried by one of said holder sections, and hooks carried by the other of said holder sections adapted to engage said eyes after said holder and pot carried thereby have been forced into the ground.

GEORG M. von HASSEL.

Witnesses:
  OTTO LINDBERG,
  L. GILL.

Copies of this patent may be obtained for five cents each, by addressing the "Commissioner of Patents, Washington, D. C."